United States Patent

Leonard et al.

[15] 3,654,442
[45] Apr. 4, 1972

[54] AUTOMATIC SYSTEM FOR MONITORING A PHYSICAL QUANTITY

[72] Inventors: Didier Leonard, Boulogne; René Pautrat, Chelles, both of France

[73] Assignee: Thomson CSF.

[22] Filed: Jan. 22, 1968

[21] Appl. No.: 699,642

[52] U.S. Cl. .................................. 235/92 PC, 250/83.6 R
[51] Int. Cl. ........................................................ G06m 11/04
[58] Field of Search ................. 235/92, 156, 151, 27, 50, 52, 235/30; 250/83.6, 83.6 FT, 106; 176/19

[56] References Cited

UNITED STATES PATENTS

| | | | |
|---|---|---|---|
| 2,874,305 | 2/1959 | Wilson et al. | 250/83.6 |
| 2,963,588 | 12/1960 | Wilson | 250/83.6 |
| 3,221,166 | 11/1965 | Allenden | 250/83.6 |
| 3,339,071 | 8/1967 | Fowler et al. | 250/83.6 |
| 3,448,269 | 6/1969 | Dieval et al. | 250/83.6 |

*Primary Examiner*—Thomas A. Robinson
*Assistant Examiner*—Joseph M. Thesz, Jr.
*Attorney*—Craig, Antonelli, Stewart & Hill

[57] ABSTRACT

System for automatically monitoring a physical quantity by periodic sampling wherein the interval between samplings and the duration of the samplings is varied according to a predetermined ratio each time the magnitude of the measured physical quantity transgresses a threshold value. A timer is provided with individual cams for periodically controlling the sampling interval and the measuring interval and a timer motor drives the cams at a controllable speed. A control arrangement having the threshold values stored therein monitors the measured values and adjusts the speed of the timer motor by a factor $k$ each time the measured value transgresses a threshold value, thereby adjusting both the sampling time and the measuring time of the system.

16 Claims, 2 Drawing Figures

AUTOMATIC SYSTEM FOR MONITORING A PHYSICAL QUANTITY

The invention relates to a system for monitoring a physical quantity measurable by sampling according to a sequence which varies in dependence on the measured value, and more especially to a system comprising facilities for recording a quantity proportional to the degree of contamination of the atmosphere by radioactive sprays in a given locality, and for triggering an alarm when the degree of contamination exceeds a predetermined value.

A system of this kind, various forms of which are already known, is essentially constituted to two units: (1) a sampling apparatus and (2) an apparatus for analyzing and recording the level of radioactivity in the sample.

The sampling unit essentially comprises a pumping device which draws air through a sheet of filter paper on which the atmospheric dust, especially the radioactive dust, will settle. The system must be suitable for use in the most diverse types of locations, in particular for from all industrial power sources, for which reason it is fitted with a power source in the form of a storage battery. Consequently, the servicing of a network of monitoring stations involves a periodic replacement of the storage batteries. It is of course advantageous to have the longest possible replacement intervals, which require that the mean power consumption be as low as possible.

In order to economize power, the sampling of the air by suction is not carried out continuously, but only during relatively brief periods separated by relatively long rest periods. On the other hand, in an obviously danger-free situation, with a very low level of radioactivity, it is permissible to carry out the sampling at very long intervals, for example, hourly. However, if the level of radioactivity increases, it is absolutely necessary to increase the sampling frequency, because of the necessity of detecting as precisely as possible that instant in which the danger level is reached.

However, if the apparatus is programmed to increase the sampling frequency at random in accordance with the instantaneous variations of detected radioactivity, this could lead to much faster exhaustion of the power reserve of the storage batteries in some cases.

To avoid this situation, and also to keep the replacement rate of the storage batteries as low as possible while preserving an adequate margin of safety, the system comprises means for shortening the sampling intervals according to a preset ratio when the measured radioactivity exceeds the value of a predetermined measurement, and to shorten according to the same ratio the duration of each sampling operation.

If, for low level of radioactivity, the sampling unit operates for $p$ minutes $n$ times per hour, while for a higher level of radioactivity it operates during $p/k$ minutes, $kn$ times per hour, the "hourly unit consumption" of power of the sampling element will be the same in both cases. In particular, the change in the duration and in sampling frequency is brought about when the measured quantity exceeds a threshold value.

This method is justified by the fact that, on the one hand, for an increased level of radioactivity, a briefer sampling operation will yield a measured value of the same order of magnitude as a sampling operation of longer duration for a lower level of radioactivity and that, on the other hand, the frequency of information will increase on approaching a dangerous situation.

According to the invention, an automatic system for monitoring a physical quantity by periodic sampling comprising a program element, a threshold circuit in which at least one threshold value and one alarm value have been recorded, said program element containing control means for varying the intervals between the samplings and the duration of the individual sampling operations according to a predetermined ratio $k$ each time a previously executed measurement of a sample quantity exceeds a threshold value recorded in said threshold circuit, this variation being effected either as a multiplication by the factor $k$ or as a division by $k$ according to the direction taken by the measured value when passing through the threshold value, as well as means for triggering an alarm when a measured value exceeds the alarm value recorded in said threshold circuit.

According to another feature of the invention, means are provided for adjusting a scale factor according to the instantaneous values of the interval-duration parameter pair, in order to obtain mutually comparable measured values in all circumstances.

The invention will now be described with reference to the accompanying drawings, which illustrate the invention but in no restrictive sense.

Figure 1:
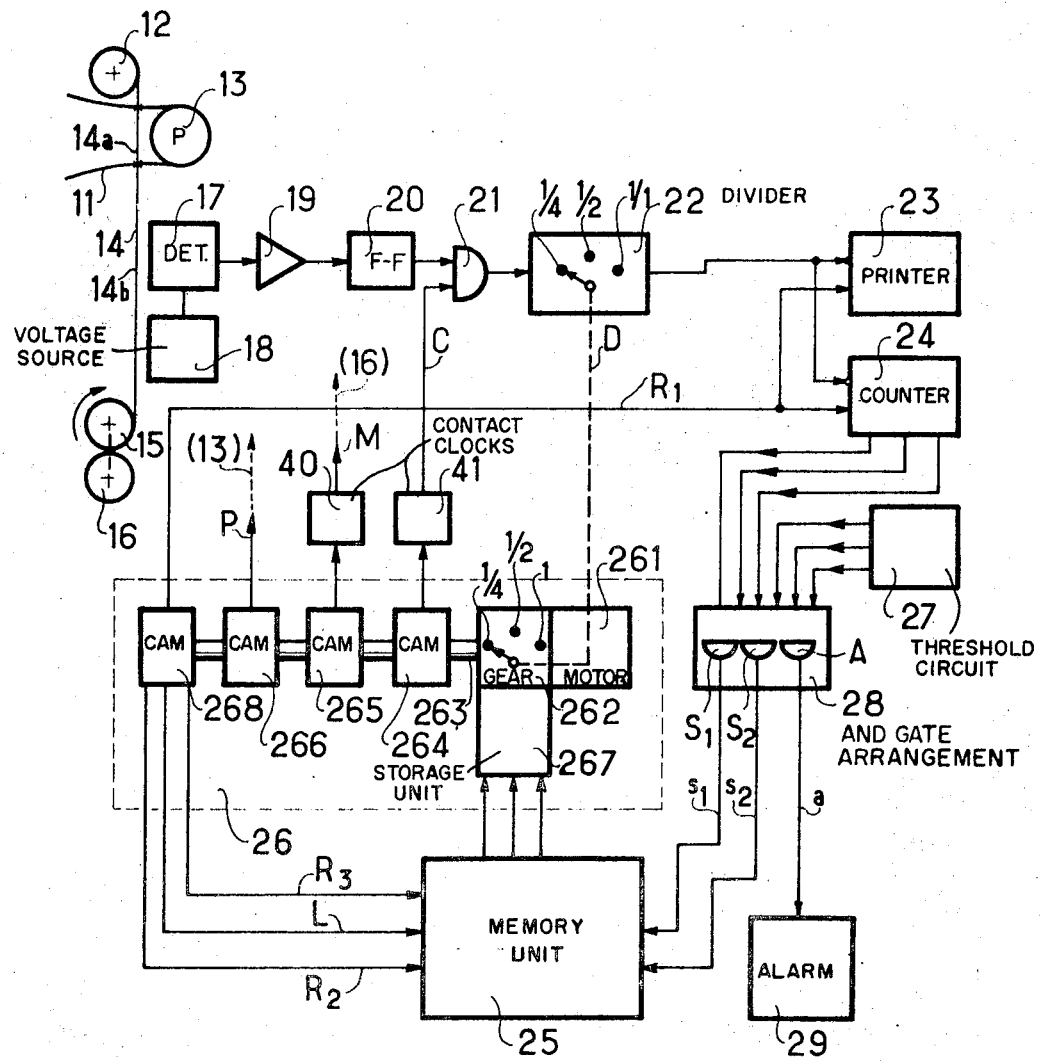
FIG. 1 is a schematic block diagram of one embodiment of the invention, as applied to the monitoring of radioactivity.

According to FIG. 1, a suction sleeve 11 connected to a suction pump 13 is adapted to convey the air drawn in thereby through a portion 14a of a band of filter paper 14 which is taken off a storage roll 12 by a take-off bobbin 15 due to the action of a periodically energized drive motor 16.

The radioactivity of the dust particles retained by the filter paper during a previous sampling at zone 14a is measured after displacement to a paper zone 14b by a suitable element, for example a Geiger tube 17, which is supplied with high voltage from a source 18.

The ionizing pulses produced by the tube 17 with each emission of a particle originating on the paper at paper zone 14b are amplified by the amplifier 19 and are shaped by a suitable circuit, for example a monostable flip-flop 20. An AND gate 21, on receiving an opening instruction C, is capable of transmitting the pulses in a suitable form to a divider 22. The divider is shown as having three dividing ratios represented by the settable positions 1/1, 1/2 and 1/4 by way of example. Other ratios are possible in the general case, and in a different number than indicated in the example; however, a division by a power of two will always be easier to effect technically. The pulses leaving the divider 22 serve to actuate a recording printer 23 which, after each count, records the value of the count on a strip of paper. These pulses are also received in a counter 24, which may be of the decimal type, but also—and more simply—may be of the binary type.

A program element 26 is constructed so as to be capable of emitting the following instructions:

1. Instruction P, start and stop of pump 13;
2. Instruction M, start of motor 16, the stopping of which is initiated by a first contact clock 40;
3. Instruction C, opening of gate 21, the closing of which is triggered by a second contact clock 41;
4. Instruction $R_1$, resetting to zero the printer 23 and the counter 24;
5. Three instructions $R_2$, L and $R_3$ addressed to a memory unit 25.

The program element 26 has a shaft 263 driven by a motor 261 via a reducing gear 262 controlled by a contactor 267 forming a storage unit having a storage capability, e.g. through the use of latching relays. The shaft 263 carries four cam arrangements: cam 264 for producing instruction C, cam 265 for producing instruction M, cam switch 266 for producing instruction P and the cam switch 268 for producing instructions $R_1$, $R_2$, L and $R_3$. The control D of the divider 22 is associated with the control of reducing gear 262 so that the divider and the reducing gear operate together.

The counter 24 is connected with a threshold circuit 27 adapted for display, which is in turn connected to a coincidence circuit 28 of three AND gates, referenced respectively $S_1$, $S_2$ and A, with outputs at $s_1$, $s_2$, and $a$. By means of the threshold circuit 27 a threshold signal $S_1$ is applied to one input of gate $S_1$, a threshold signal $S_2$ is applied to one input of gate $S_2$; and an alarm signal A is applied to the gate A. The outputs of gates $S_1$ and $S_2$ are connected to the contactor 267 by way of memory unit 25. The output $a$ of Gate A is connected directly to an alarm device 29.

The shaft 263 further entrains a cam switch 268 which generates an instruction signal $R_1$ resetting to zero the printer 23 and the counter 24. This same cam switch 268 also transmits three instruction signals $R_2$, L and $R_3$ to the memory unit 25. The successive instants of emission of the instructions $R_1$, $R_2$, L, $R_3$ can be advantageously situated at approximately half of the intervals between samplings. The instruction $R_2$ returns the elements 262 and 22 to the position 1/4 (if they are not already there); the instruction L determines the desired position of these same elements according to the state of the memory unit 25; and instruction $R_3$ resets the memory unit 25 to zero.

The duration T of the sampling operations and the intervals I between sampling could, for example, be fixed in the following manner:

| Radioactivity | T | I |
|---|---|---|
| Less than threshold $S_1$ | 4 min. | 60 min. |
| Between threshold $S_1$ and threshold $S_2$ | 2 min. | 30 min. |
| Greater than threshold $S_2$ | 1 min. | 15 min. |

Figure 2:
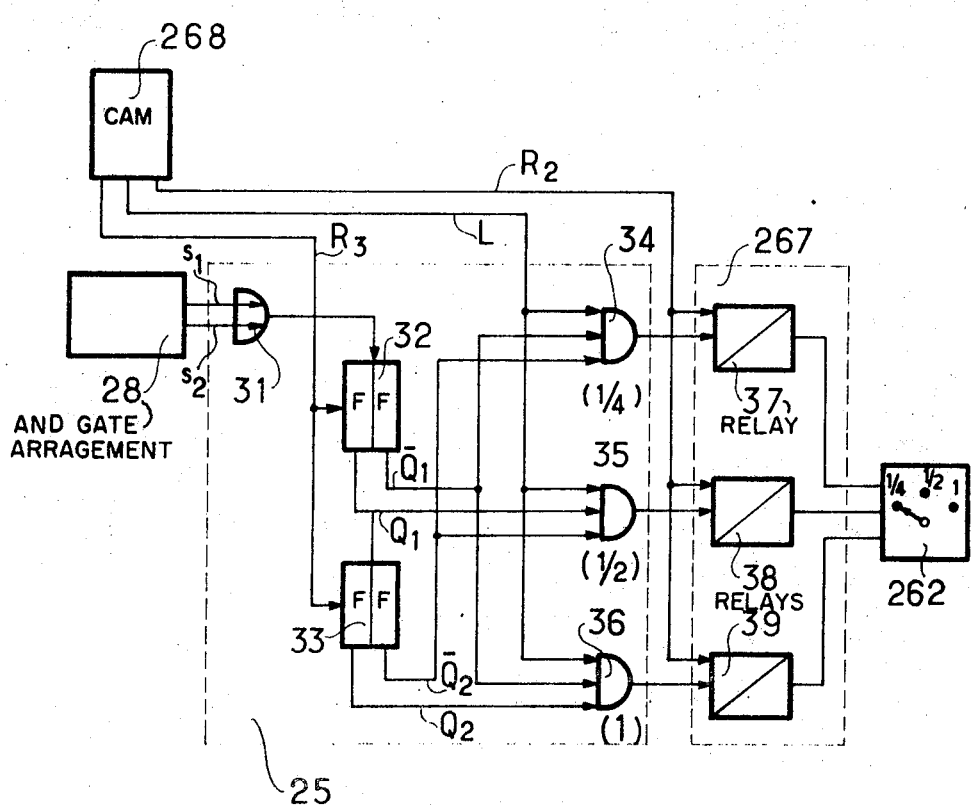
FIG. 2 is a diagram of a detail of the unit of FIG. 1.

FIG. 2 shows a diagram of an exemplary form of the elements 25 and 267 of FIG. 1. In FIG. 2, the elements designated 28, 262 and 268 are the same as elements similarly designated in FIG. 1.

The two outputs of the gates $S_1$ and $S_2$ of the coincidence circuit 28 formed of AND gates $S_1$, $S_2$ and A are connected to the input of an OR gate 31, whose output signal is applied to the input of a counter made up of binary flip-flops 32 and 33, having respective outputs $Q_1$, $\overline{Q_1}$ and $Q_2$, $\overline{Q_2}$. The outputs $\overline{Q_1}$ and $\overline{Q_2}$ are connected to the inputs of an AND gate 34; the outputs $Q_1$ and $Q_2$ are connected to the inputs of an AND gate 35 and the outputs $\overline{Q_1}$ and $Q_2$ are connected to the inputs of an AND gate 36.

An output signal from the AND gate 34 is applied to energize a relay 37 which has a memory function (for example by way of a holding contact such as provided by a latching relay), and which controls the positioning of the speed reducer 262 to the position 1/4. Similarly, AND gate 35 is connected to energize a relay 38, of the same type as relay 37, which controls the setting of the speed reducer 262 to the 1 position. The three relays 37, 38 and 39 are parts of the contactor 267 shown in FIG. 1.

The instruction signal $R_2$, generated by the cam switch 268, triggers the transmission to the aforesaid relays of instructions corresponding to the state of the flip-flops 32 and 33, and consequently the setting of speed reducer 262 in accordance with this state, through enabling of the AND gates 34, 35 and 36. This setting is held until the next sampling, because the relays 37, 38 and 39 have a memory function.

The $R_3$ instruction subsequently triggered by the cam switch 268 resets the flip-flops 32 and 33 to zero. readying them for a new recording which will take place following the next sampling.

The operation of the disclosed system is as follows:

The system is assumed to be operational and the radioactivity is assumed to be initially low, i.e. the threshold $S_1$ has not been exceeded. The divider 22 is in the 1/4 position. Every hour, the pump 13 is operated by the cam switch 266 for 4 minutes. Following this, the cam 265 triggers a paper advance, bringing the portion of paper in zone 14a previously transversed by the air drawn in, to the position 14b in front of the Geiger tube 17. The duration of this paper advance, controlled by the contact clock 40, may for example be of 1 minute.

Gate 21 is then opened by instruction C, for a fixed period controlled by the contact clock 41, for example for 5 minutes. During this time the output of Geiger tube 17 is applied via divider 22 to the printer 23 and counter 24.

Around the 30th minute following the start of the sampling, the instruction $R_1$ is triggered by cam 268, as well as instructions $R_2$, L and $R_3$. The first triggers the printer 23, then resets it to zero, and also effects the resetting to zero of counter 24. The instructions $R_2$, L and $R_3$ are inoperative at this stage. Sampling recommences in the 60th minute.

Let us assume that on this occasion the threshold $S_1$ has been exceeded by the number recorded by counter 24 at the end of the counting operation. The result of which is a signal transmitted by the element 28 to the flip-flop 32 memory unit 25 by the intermediary of OR gate 31. The counter assumes the state: $Q_1 = 1$, $\overline{Q_2} = 1$. The arrival of instruction $R_2$ confirms the speed reducer 262 in the 1/4 position which it was already occupying.

With the subsequent arrival of the read instruction L, the gate 35 transmits an instruction to the relay 38, and the speed reducer 262 takes up the 1/2 position. At the same time, the D-instruction switches the divider 22 to the 1/2 position. The next following instruction $R_3$ then resets the two flip-flops into the initial position.

As long as the intensity of the radioactivity remains between the threshold values $S_1$ and $S_2$, each sampling will lead to the previously described operational sequence. The shaft 268 now rotates twice as fast, the duration of the sampling operation becomes T = 2 minutes, and the interval between samplings I = 30 minutes.

When the intensity of the radioactivity exceeds the threshold value $S_2$, the flip-flops 32 and 33 in memory unit 25 receive two pulses from element 28 and we now reach a state $Q_1 = 1$, $Q_2 = 1$ in the memory unit. The speed reducer 262, which was switched from the 1/2 position to the 1/4 position, now passes from the 1/4 position to the "1" position. The duration T of the sampling operations is now 1 minute, and the intervals between samplings I are reduced to 15 minutes.

The recorded or counted numerical values are all expressed in terms of the same unit, for example as microcuries per cubic meter, since the divider 22 contributes a scale factor correction which ensures the constancy of the unit system.

In the present case, the system was described with reference to two threshold values, but said system is repetitive and can be immediately generalized to any number thresholds.

All the numerical values of the embodiment have been indicated solely by way of example, the scope of the invention being general and giving rise to numerous possible variations, obvious to those skilled in the art.

We claim:

1. In an automatic system for monitoring a physical quantity by periodic sampling and measurement the sampling being carried out during relatively brief periods of time separated by relatively long rest periods during which no samples are taken, the improvement comprising
    programming means for controlling the timing of said sampling, and
    a threshold unit having at least one threshold value of said physical quantity recorded therein,
    said programming means including control means of varying the interval between samplings and the duration of the individual samplings according to a predetermined ratio $k$ each time the magnitude of the physical quantity of a sampling transgresses the threshold value recorded in said threshold unit, said variation being either a multiplication by $k$ or a division by $k$ in accordance with the direction of variation taken by the value traversing said threshold value whereby when the interval between samplings is decreased, the duration of individual samplings will also be decreased.

2. The combination defined in claim 1 wherein said threshold unit also has an alarm value of said physical quantity higher than said threshold value recorded therein, said programming means further including alarm means for generating an alarm in response to said physical quantity exceeding said alarm value.

3. A system for automatically monitoring a physical quantity by taking samples during relatively brief periods separated by intervals during which no samples are taken comprising
    means for measuring said physical quantity,
    timing means for actuating said measuring means periodically so as to monitor said physical quantity by periodic sampling, and control means responsive to measured values derived from said measuring means for varying the interval between samplings and the duration of individual samplings through control of said timing means according to a predetermined ratio $k$ each time the measured value transgresses prescribed threshold values whereby when the frequency of the samplings taken is increased, the duration of the individual samplings will be decreased.

4. A system as defined in claim 3 wherein said measuring means includes a device for measuring the sampled quantity and adjusting means responsive to said control means for adjusting the scale factor of said measuring means in inverse proportion to the ratio of variation of said timing means by said control means.

5. A system as defined in claim 4 wherein said measuring means further includes gating means responsive to said timing means for enabling said device for measuring.

6. A system as defined in claim 3, wherein said control means includes a numerical measuring system responsive to said measuring means for detecting the transgression of said measured values through $n$ thresholds and having a first counter connected to the output of said measuring means, threshold means for storing said $n$ thresholds, coincidence means connected to said first counter and said threshold means for detecting transgression of said thresholds and memory means responsive to said coincidence means for storing control values applied in control of said timing means.

7. A system as defined in claim 6 wherein said memory means includes a second counter having at least $n$ states connected to said coincidence means for counting the number $m$ of thresholds transgressed, storage means responsive to the count of said second counter for varying the ratio of said timing means by a factor $mk$.

8. A system as defined in claim 7 wherein said storage means includes at least $n$ latching relays periodically connected to said second counter by said timing means.

9. A system as defined in claim 7 wherein said timing means includes means for resetting said first and second counters and said storage means to a reference condition between sampling operations.

10. A system as defined in claim 6 wherein said timing means includes a motor connected to a shaft through a controllable speed reducer, and cam means driven by said shaft for timing operation of said measuring means and said control means.

11. A system as defined in claim 3 wherein said measuring means includes a pump device for drawing air through a strip of filter paper supported by an advancing mechanism, said pump device and said advancing mechanism being sequentially operated periodically by said timing means.

12. A system as defined in claim 11 wherein said measuring means further includes an analyzer element capable of producing impulses in proportion to the magnitude of the detected physical quantity and a device for dividing the number of pulses by a factor $k$.

13. A system as defined in claim 12 wherein said timing means includes a motor connected to a shaft through a controllable speed reducer; said device for dividing and said speed reducer being controlled simultaneously by said control means.

14. A system as defined in claim 13 wherein said control means includes a numerical measuring system responsive to said measuring means for detecting the transgression of said measured values through $n$ thresholds and having a first counter connected to the output of said measuring means, threshold means for storing said $n$ thresholds, coincidence means for detecting transgression of said thresholds and memory means responsive to said coincidence means for storing control values applied in control of said timing means.

15. A system as defined in claim 14 wherein said memory means includes a second counter having at least $n$ states connected to said coincidence means for counting the number $m$ of thresholds transgressed, storage means responsive to the count of said second counter for varying the ratio of said timing means by a factor mk.

16. A system as defined in claim 1, further including measuring means for measuring said physical quantity, timing means forming part of said program means for actuating said measuring means periodically, and adjusting means responsive to said control means for adjusting the scale factor of said measuring means in inverse proportion to the ratio of variation of said timing means by said control means.

* * * * *